United States Patent
Phillips et al.

(10) Patent No.: US 8,782,700 B2
(45) Date of Patent: Jul. 15, 2014

(54) CONTROLLING ONE OR MORE ATTRIBUTES OF A SECONDARY VIDEO STREAM FOR DISPLAY IN COMBINATION WITH A PRIMARY VIDEO STREAM

(75) Inventors: Christopher Phillips, Winchester (GB); Matthew Whitbourne, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 12/957,924

(22) Filed: Dec. 1, 2010

(65) Prior Publication Data
US 2011/0261259 A1   Oct. 27, 2011

(51) Int. Cl.
*H04N 5/455* (2006.01)
*H04N 5/45* (2011.01)

(52) U.S. Cl.
USPC .................................. 725/40; 725/46; 725/47

(58) Field of Classification Search
None
See application file for complete search history.

(56) References Cited

U.S. PATENT DOCUMENTS

| | | | | |
|---|---|---|---|---|
| 6,483,986 B1* | 11/2002 | Krapf | | 386/243 |
| 6,874,126 B1* | 3/2005 | Lapidous | | 715/711 |
| 7,187,418 B2* | 3/2007 | Phillips et al. | | 348/565 |
| 7,757,254 B2* | 7/2010 | Shoff et al. | | 725/44 |
| 8,495,671 B1* | 7/2013 | Ribeiro et al. | | 725/13 |
| 2004/0150750 A1* | 8/2004 | Phillips et al. | | 348/565 |
| 2006/0245736 A1* | 11/2006 | Affaki | | 386/109 |
| 2007/0133950 A1* | 6/2007 | Yoshida et al. | | 386/108 |
| 2007/0225840 A1* | 9/2007 | Yahata et al. | | 700/94 |
| 2008/0285948 A1* | 11/2008 | Iwase et al. | | 386/95 |
| 2008/0291329 A1* | 11/2008 | Mizosoe et al. | | 348/565 |
| 2009/0094636 A1* | 4/2009 | Lee | | 725/32 |
| 2009/0094637 A1* | 4/2009 | Lemmons | | 725/32 |
| 2009/0102973 A1* | 4/2009 | Harris | | 348/565 |
| 2010/0135637 A1* | 6/2010 | McDermott et al. | | 386/75 |
| 2010/0188573 A1* | 7/2010 | Kuusiholma et al. | | 348/468 |
| 2010/0201879 A1* | 8/2010 | VanDuyn et al. | | 348/565 |

FOREIGN PATENT DOCUMENTS

| | | | |
|---|---|---|---|
| EP | 1 978 660 A2 | | 10/2008 |
| EP | 2129110 A2 | * | 4/2009 |
| EP | 2 129 110 A2 | | 12/2009 |

OTHER PUBLICATIONS

PCT/EP2011/0556655, International Search Report and Written Opinion, Jun. 6, 2011.

* cited by examiner

*Primary Examiner* — John Schnurr
*Assistant Examiner* — Cynthia Fogg
(74) *Attorney, Agent, or Firm* — Yudell Isidore Ng Russell PLLC

(57) ABSTRACT

A method controls one or more attributes of a secondary video stream for display in combination with a primary video stream. The method comprises: identifying a primary video stream; identifying a secondary video stream; assigning one or more settings for one or more attributes of said secondary video stream to a predetermined set of one or more user identifiers; identifying the user identifier associated with a given video processing module; determining the one or more attribute settings assigned to the user identifier; and processing the secondary video stream for display in combination with the primary video stream in accordance with the one or more attribute settings for the user identifier.

18 Claims, 4 Drawing Sheets

CONTROLLING ONE OR MORE ATTRIBUTES OF A SECONDARY VIDEO STREAM FOR DISPLAY IN COMBINATION WITH A PRIMARY VIDEO STREAM

PRIORITY CLAIM

The present application claims benefit of priority under 35 USC §120 and §365 to the previously filed Great Britain Patent Application No. 10161003.8 entitled, "A Method, Apparatus and Software for Use in a Video Processing Module for Controlling One or More Attributes of a Secondary Video Stream for Display in Combination with a Primary Video Stream" with a priority date of Apr. 26, 2010. The content of that application is incorporated by reference herein.

BACKGROUND

1. Field of Invention

The present invention relates to a method, an apparatus or a program product for controlling one or more attributes of a secondary video stream for display in combination with a primary video stream.

2. Background of the Invention

Commercial television broadcasts commonly include interludes in programming in which advertisements are broadcast. Such advertisements may be inserted within a discrete programming element such as a television program or film and thus interrupt the respective programming element. For example, when viewing a live event, such as a sports fixture, the viewer may be denied viewing of one or more critical parts of the event due to such critical parts coinciding with the broadcast of advertisements. For some events, this degradation of the viewing experience may be reduced by ad-hoc scheduling of advertisements breaks to coincide with natural beaks in the live events such as half-time intervals in football or the time between overs in cricket. However, such ad-hoc scheduling is a time consuming manual process. Furthermore, this technique is not applicable where the activity in the viewed event in continuous, that is, the event comprises no natural breaks suitable for the insertion of advertisements.

SUMMARY

An embodiment provides a method for use in a video processing module for controlling one or more attributes of a secondary video stream for display in combination with a primary video stream. The method comprises: identifying a primary video stream; identifying a secondary video stream; assigning one or more settings for one or more attributes of said secondary video stream to a predetermined set of one or more user identifiers; identifying the user identifier associated with a given video processing module; determining the one or more attribute settings assigned to the user identifier; and processing the secondary video stream for display in combination with the primary video stream in accordance with the one or more attribute settings for the user identifier.

The attributes can govern the level of obtrusion of the secondary video stream on the primary video stream when displayed in combination. The attributes comprise one or more attributes for the processing of the secondary video stream data into a video image for display. One or more of the user identifiers can be associated with data representing a predetermined service level for the primary video stream and the level of obtrusion is dependent on the service level. The level of each setting may be determined dependent on the service level. Each service level may be associated with a predetermined set of the settings. One or more of the sets of settings may be modifiable by a user within predetermined limits.

One of the attributes may govern the size of the display of the secondary video stream. One of the attributes can govern the position of the display of the secondary video stream. One of the attributes can govern the opacity of the display of the secondary video stream. The secondary video stream can comprise picture-in-picture (PiP) advertising data. The primary video stream may comprise a continuous live video transmission. One or both of the video streams may be broadcast. The video processing module may be comprised by a television signal receiving apparatus.

Another embodiment provides an apparatus for use in a video processing module for controlling one or more attributes of a secondary video stream for display in combination with a primary video stream. The apparatus is operable to: identify a primary video stream; identify a secondary video stream; assign a set of one or more settings for attributes of the secondary video stream to a predetermined set of one or more user identifiers; identify the user identifier associated with a given video processing module; determine the or each attribute setting assigned to the user identifier; and process the secondary video stream for display in combination with the primary video stream in accordance with the or each attribute setting for the user identifier.

A further embodiment provides a computer program product comprising program code adapted to perform a method for use in a video processing module for controlling one or more attributes of a secondary video stream for display in combination with a primary video stream. The program code comprising code adapted to perform the functions of: identifying a primary video stream; identifying a secondary video stream; assigning a set of one or more settings for attributes of the secondary video stream to a predetermined set of one or more user identifiers; identifying the user identifier associated with a given video processing module; determining the or each attribute setting assigned to the user identifier; and processing the secondary video stream for display in combination with the primary video stream in accordance with the or each attribute setting for the user identifier.

Another embodiment provides a computer program product comprising program code adapted to provide an apparatus for use in a video processing module for controlling one or more attributes of a secondary video stream for display in combination with a primary video stream. The apparatus is operable to: identify a primary video stream; identify a secondary video stream; assign a set of one or more settings for attributes of the secondary video stream to a predetermined set of one or more user identifiers; identify the user identifier associated with a given video processing module; determine the or each attribute setting assigned to the user identifier; and process the secondary video stream for display in combination with the primary video stream in accordance with the or each attribute setting for the user identifier.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
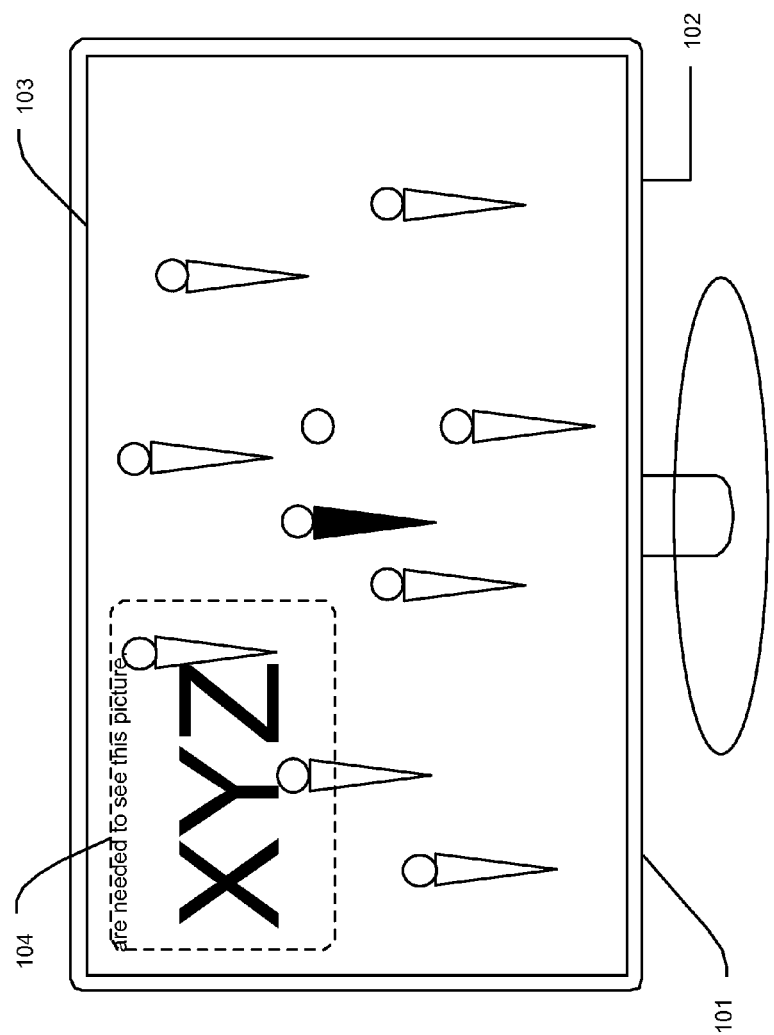
FIG. 1 is a schematic illustration of a display device displaying a primary video stream in combination with a secondary video stream.

With reference to FIG. 1, a display device 101, in the form of a television (TV), comprises an input 102 for receiving data for display on the TV 101. The data is received in the form of a single video stream via the input 102 that comprises a primary video stream 103 in combination with a secondary video stream 104. In the present embodiment, the primary video stream 103 represents a live event, such as a football match or motor racing event, and the secondary video stream comprises one or more advertisements. In the received single video stream, the secondary video stream 104 is overlaid on the primary video stream 103. As a result, the secondary video stream 104 at least partially obscures a portion of the primary video stream 103. In other words, the display of the secondary video stream 104 has a predetermined level of obtrusion over the primary video stream 103.

Figure 2:
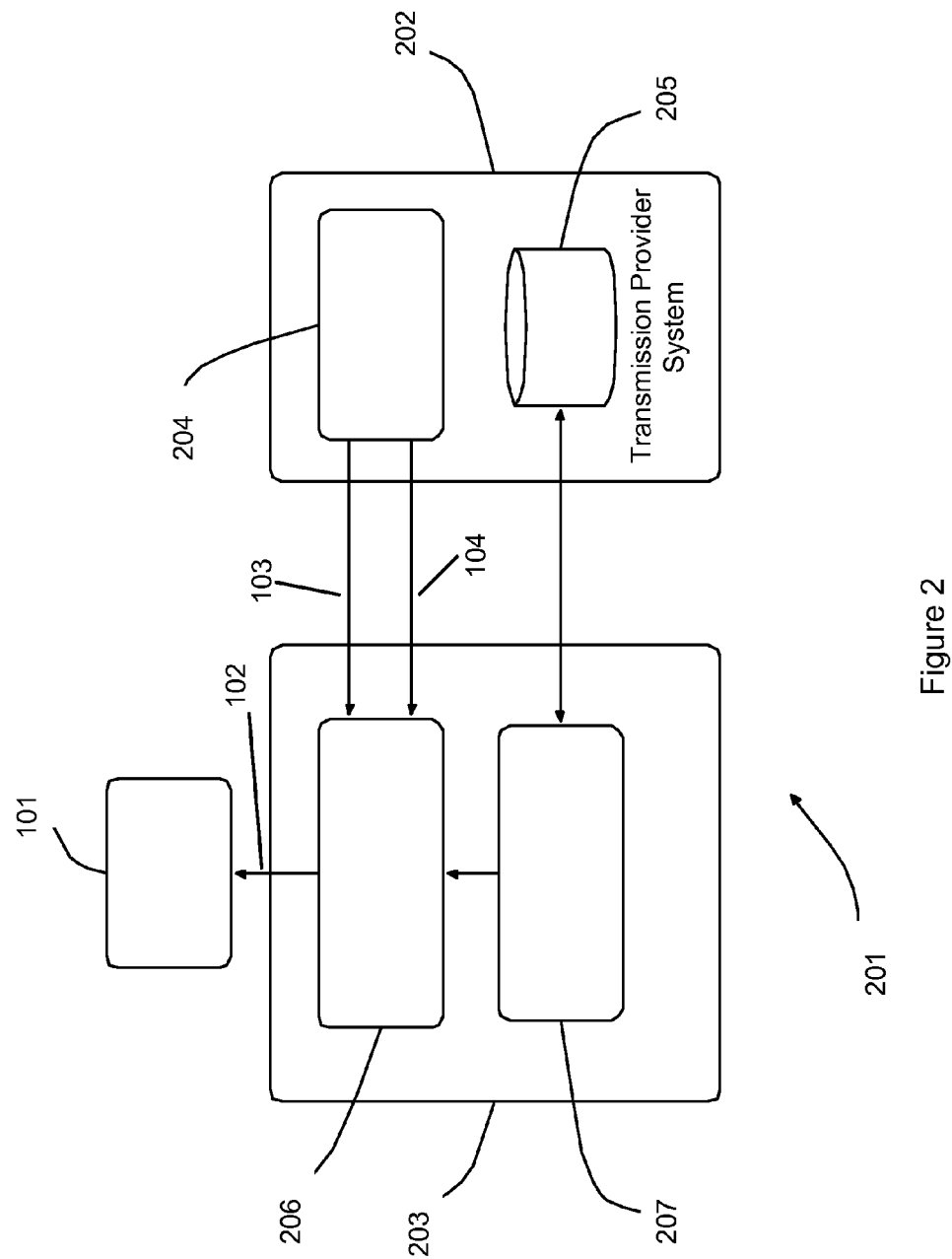
FIG. 2 is a schematic illustration of a video transmission system comprising a video processing module for processing video streams for display on the display device of FIG. 1.

With reference to FIG. 2, in the present embodiment, the input 102 for the TV 101 is supplied from a video transmission system 201 comprising a transmission provider system 202 and a transmission receiver system 203, which represents and is thus interchangeably referred to herein as a video processing module 203. The transmission provider system 202 comprises a transmissions source 204, in the form of a live video transmission feed and an advertisement transmission feed, and an account database 205. The transmission source 204 is arranged to transmit signals representing the primary and secondary video streams 103, 104. In the present embodiment, the live primary video stream 103 is transmitted continuously for its duration and the secondary video stream 104 is transmitted periodically, that is, at predetermined time intervals. The account database 205 comprises user accounts for users of respective transmission receiver systems 203 permitted to receive the primary video stream 103. An account record in the account database 205 represents each user account. Each account record comprises data that associates an account identifier with a predetermined set of one or more attribute settings that govern the level of obtrusion of the display of the secondary video stream 104 and are described in further detail below with reference to FIGS. 3a and 3b.

The transmission receiver system or video processing module 203 comprises a signal combination module 206 and a picture-in-picture (PiP) management module 207. The signal combination module 206 is arranged to receive the primary and secondary video streams 103, 104 transmitted by the transmission provider system 202 and to combine the received primary and secondary video streams 103, 104 into the single video stream provided to the input 102 of the TV 101. The PiP management module 207 governs the combination of the primary and secondary video streams 103, 104 by the signal combination module 206 so as to produce the predetermined level of obtrusion of the secondary video stream 104 over the primary video stream 103. The PiP management module 207 is arranged to input a user identifier associated with the transmission receiver system 203 and to use the user identifier to access the relevant account record in the account database 205 and retrieve the set of one or more attribute settings that govern the level of obtrusion of the display of the secondary video stream 104 for the relevant user identifier. These parameters are then provided to the signal combination module 206 for use in the combination of the primary and secondary video streams 103, 104 to produce the single video stream provided to the input 102 of the TV 101.

Figure 3A:
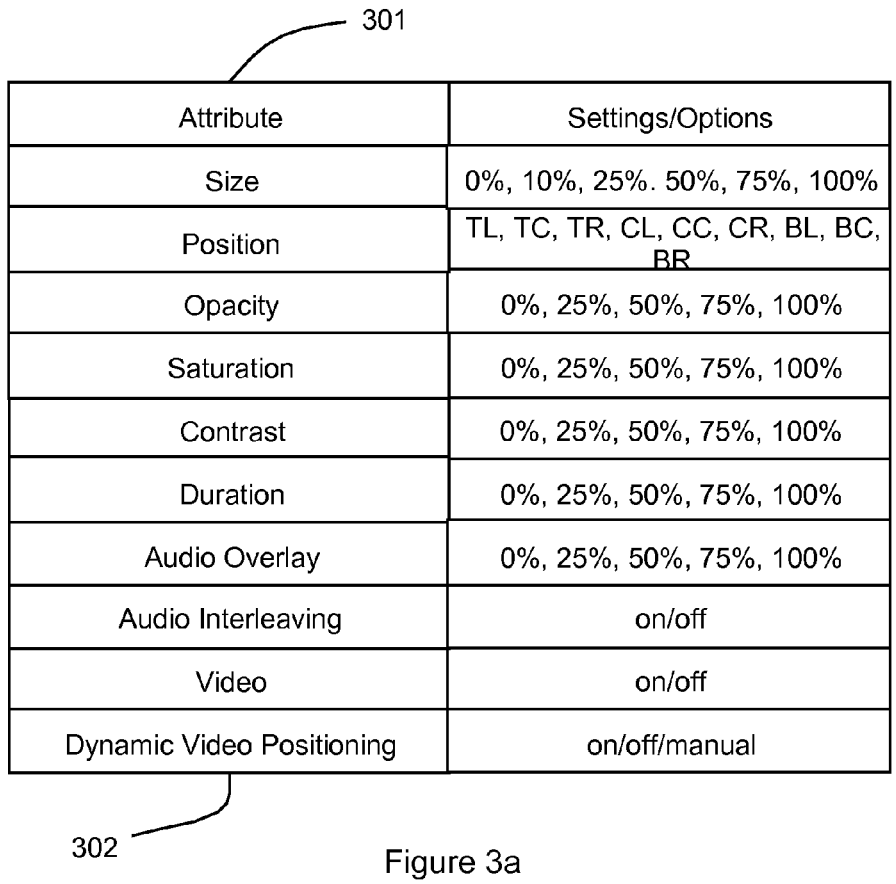
FIG. 3a is a table illustrating settings for attributes used by the video processing module of FIG. 2 for processing the secondary video stream for display in combination with the primary video stream.

With reference to FIG. 3a, in the present embodiment, the settings for the attributes or options that govern the level of obtrusion of the display of the secondary video stream 104 are selected from an attribute settings table 301. In the present embodiment, the attribute settings table 301 comprises ten such attributes 302 as follows:

Size: the size of the display of the secondary video stream 104 as a proportion or percentage of the display of the primary video stream 103.

Position: The position of the display of the secondary video stream 104 relative to the display of the primary video stream 103. For example, top left (TL), centre right (CR), bottom right (BR) or central (CC).

Opacity: the opacity of the display of the secondary video stream 104. In other words, the degree of transparency of the display of the secondary video stream 104.

Saturation: the colour saturation of the display of the secondary video stream 104.

Contrast: the degree of difference between the tones in the display of the secondary video stream 104.

Duration: the duration of the display of the secondary video stream 104.

Audio Overlay: the degree of overlay of the audio portion of the secondary video stream 104 on the audio portion of the primary video stream 103. In other words, this attribute governs the level of obtrusion of the soundtrack of the secondary video stream 104 over that of the primary video stream 103.

Audio Interleaving: the audio portion of the secondary video stream 104 is interleaved with the audio portion of the primary video stream 103 taking precedent. In other words, the audio portion of the secondary video stream 104 is only presented when the audio portion of the primary video stream 103 falls below a predetermined threshold.

Video: the video element of the secondary video stream 104 can be omitted leaving only the audio portion of the secondary video stream 104 for combination with the primary video stream.

Dynamic Video Positioning/Sizing: the video portion of the secondary video stream 104 is dynamically repositioned within the portion of the primary video stream 103 that demonstrates least movement or change. In other words, for a live video stream of a sporting event, such as motor racing, the secondary video stream 104 is dynamically repositioned so as to reduce its obtrusion on the action being displayed in the primary video stream 103. Alternatively, or in addition, the secondary video stream 104 may be dynamically resized with the same objective.

Figure 3B:
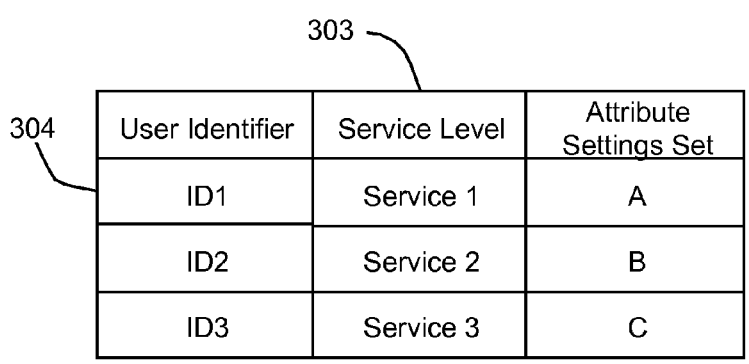
FIG. 3b is a table illustrating data correlating user identifiers with service levels and associated sets of attribute settings for use by the video processing module of FIG. 2.

With reference to FIG. 3b, in the present embodiment, the account database 205 stores each account record as a line in an account record table 303. Each account record 304 specifies a service level (1, 2, 3) and an attribute settings set (A, B, C) for each user identifier. The service level identifies the level of service to which a given user has subscribed. The attribute settings set defines a predetermined set of one or more attribute settings 303 selected from the attribute settings table 301 for the display of the secondary video stream 104.

Figure 4:
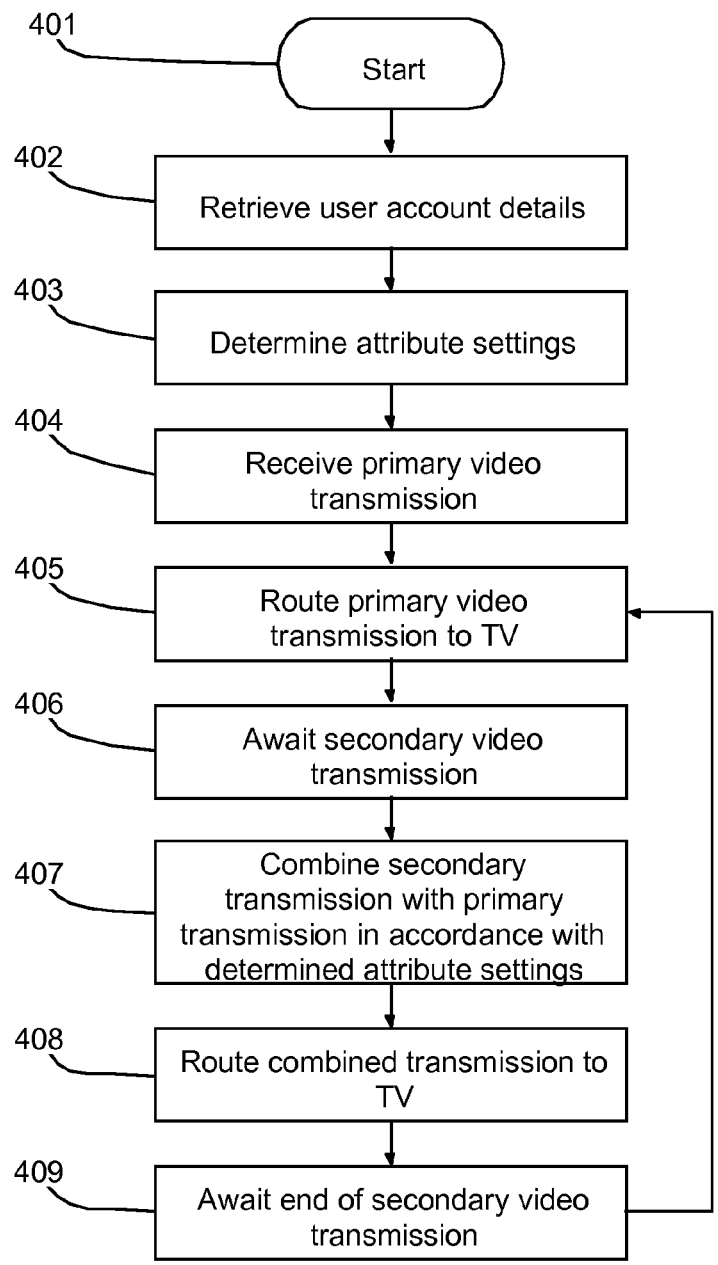
FIG. 4 is a flow chart illustrating processing performed by the video processing module of FIG. 2 when processing video streams for display on the display device of FIG. 1.

The processing performed by the video processing module 203 or the transmission receiver system 203 will now be described in further detail with reference to the flow chart of FIG. 4. Processing is initiated at step 401 in response to the start up of the video processing module 203 and processing moves to step 402. At step 402, the user identifier associated with the video processing module 203 is identified and used to select the account record 304 for the user from the account database 205. At step 403, the attribute settings assigned to the relevant user identifier 304 are identified. At step 404, the primary video stream 103 is received. At step 405, the primary video stream 103 is routed to the TV 101 for display. At step 406, processing awaits the reception of the secondary video stream 104 and once the secondary video stream is received, the secondary video stream 104 is processed in accordance with the identified attribute settings and combined with the primary video stream 103 at step 407. At step 408, the combined primary and secondary video streams are routed to the TV 101 for display. At step 409 processing awaits the end of the secondary video stream or an interval in the secondary video stream, and when either is detected processing moves to step 405 where routing of the primary video stream alone is resumed. Processing proceeds as described above.

In another embodiment, a user is provided with a menu for selecting the settings for one or more attribute settings. The attributes that may be modified by the user may be limited, for example, by subscription group or tariff band. The selected level of the attribute or each attribute may contribute to a quality level for the given set of attributes. The quality level may be measured against one or more quality thresholds, which if crossed, may result in an actual or proposed change in the subscription group for the relevant user.

In a further embodiment, a user or a provider within the subscription group may amend the attribute set or settings dynamically. In other words, attributes or their settings may be modified during the reception of a given primary video stream. In another embodiment, a single or reduced set of attributes is modifiable by a user. For example, just size or position may be modifiable. Differing sets of attributes may be provided for a user and a corresponding provider.

As will be understood by those skilled in the art, the transmission of video streams may be achieved by any suitable means. The primary and secondary video streams may have the same or different transmission signals, paths or mediums. Each video stream may be transmitted by any suitable scheme or protocol such as broadcast, multicast or monocast. The secondary video stream may be received as an additional transmission for a TV receiver with multiple tuners, or from a local hard disk on which the video stream may be stored, for example, when the TV receiver is not in use, such as overnight. Account data may be downloaded periodically or on change or reset. The settings may be stored locally or centrally.

As will be understood by those skilled in the art, the primary video stream need not be a live stream but may comprise a recorded transmission such as a film or movie, for example, being viewed on a pay-per-view basis.

As will be understood by those skilled in the art, the secondary video stream may be permanently combined or overlaid on the primary video stream. The secondary video stream may become fully transparent or reduced to 0% relative size when no secondary video stream data is provided.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

In the flow charts above, one or more of the methods are implemented/embodied within a computer program product comprising a computer readable medium containing computer readable code/instructions such that a series of functions are completed/performed when the computer readable code/instructions is executed (by a processor/processing unit) on a computing device or machine. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the scope of applicant's general inventive concept.

The invention claimed is:

1. A method for controlling one or more attributes of a secondary video stream for display in combination with a primary video stream, the method comprising:
receiving a primary video stream;
receiving a secondary video stream separately from the primary video stream;
assigning one or more settings for one or more attributes of the secondary video stream to a predetermined set of one or more user identifiers;
identifying the user identifier associated with a given video processing module;
determining the one or more attribute settings assigned to the user identifier;
periodically processing the secondary video stream for display in combination with the primary video stream at one or more first predetermined time intervals in accordance with the one or more attribute settings for the processing of the secondary video stream data into a video image for display for the user identifier, wherein one or more of the user identifiers are associated with data representing a predetermined service level for the primary video stream, wherein the predetermined service level governs a level of obtrusion of the secondary video stream over the primary video stream when displayed in combination, wherein the level of obtrusion establishes a portion of the secondary video stream that at least partially obscures the primary video stream, wherein the periodic processing of the secondary video stream for display in combination with the primary video stream continues until a second predetermined time interval that is associated with the secondary video stream expires; and
in response to the second predetermined time interval expiring, resuming processing of the primary video stream alone;
wherein: the one or more attributes further comprises at least a set of attributes that govern each of:
a size of display of the secondary video stream, a position of the display of the secondary video stream, an opacity of the display of the secondary video stream, a color saturation of the secondary video stream, and a difference in contrast between the tones in secondary video stream and the primary video stream;
the predetermined service level further identifies one or more services to which one or more users associated with the predetermined service level are subscribed thereto; and
the secondary video stream comprises picture-in-picture (PiP) advertising data.

2. The method according to claim 1, wherein:
the one or more attributes further comprises attributes that govern a degree of overlay or interleaving of an audio portion of the secondary video stream relative to an audio portion of the primary video stream;
a service level of each of the one or more attribute settings is determined dependent on the predetermined service level, and wherein each service level is associated with a predetermined set of settings.

3. The method according to claim 1, wherein at least one of the one or attribute settings are modifiable by a user associated with the user identifier within one or more predetermined limits, wherein the one or more predetermined limits are determined by a subscription group or tariff band, the method further comprising:
measuring one or more modifications to the at least one of the one or more attribute settings; and
in response to determining the one or more modifications to the at least one of the one or more attribute settings have been modified beyond one or more quality thresholds, changing a subscription group of the user identifier;
wherein the one or more modifications may be performed during reception of the primary video stream.

4. The method according to claim 1, wherein the primary video stream comprises a continuous live video transmission and one or both of the video streams is broadcast.

5. The method according to claim 1, wherein the method is implemented within a video processing module that is a component of a television signal receiving apparatus.

6. An apparatus for controlling one or more attributes of a secondary video stream for display in combination with a primary video stream, the apparatus being operable to:
receive a primary video stream;
receive a secondary video stream separately from the primary video stream;
assign a set of one or more settings for attributes of the secondary video stream to a predetermined set of one or more user identifiers;
identify the user identifier associated with a given video processing module;
determine each attribute setting assigned to the user identifier;
periodically process the secondary video stream for display in combination with the primary video stream at one or more first predetermined time intervals in accordance with the attribute setting for the processing of the secondary video stream data into a video image for display for the user identifier, wherein one or more of the user identifiers are associated with data representing a predetermined service level for the primary video stream, wherein the service level governs a level of obtrusion of the secondary video stream over the primary video stream when displayed in combination, wherein the level of obtrusion establishes a portion of the secondary video stream that at least partially obscures the primary video stream, wherein the periodic processing of the secondary video stream for display in combination with the primary video stream continues until a second predetermined time interval that is associated with the secondary video stream expires; and
in response to the second predetermined time interval expiring, resume processing of the primary video stream alone;
wherein: the one or more attributes further comprises at least a set of attributes that govern each of:
a size of the display of the secondary video stream, a position of the display of the secondary video stream, an opacity of the display of the secondary video stream, a color saturation of the secondary video stream, and a difference in contrast between the tones in secondary video stream and the primary video stream; and the predetermined service level further identifies one or more services to which one or more users associated with the predetermined service level are subscribed thereto; and the secondary video stream comprises picture-in-picture (PiP) advertising data.

7. The apparatus according to claim 6, wherein:

the one or more attributes further comprises attributes that govern a degree of overlay or interleaving of an audio portion of the secondary video stream relative to an audio portion of the primary video stream;

a service level of each of the one or more attribute settings is determined dependent on the predetermined service level, and wherein each service level is associated with a predetermined set of the settings.

8. The apparatus according to claim 6, wherein at least one of the one or more attribute settings are modifiable by a user associated with the user identifier within one or more predetermined limits, wherein the one or more predetermined limits are determined by a subscription group or tariff band, the apparatus being further operable to:

measure one or more modifications to the at least one of the one or more attribute settings; and in response to determining the one or more modifications to the at least one of the one or more attribute settings have been modified beyond one or more quality thresholds, change a subscription group of the user identifier;

wherein the one or more modifications may be performed during reception of the primary video stream.

9. The apparatus according to claim 6, wherein:

the primary video stream comprises a continuous live video transmission and one or both of the video streams is broadcast; and the apparatus is operational within a video processing module that is a component of a television signal receiving apparatus.

10. A computer program product comprising a computer readable storage device and program code embodied on the computer readable storage device that executes on a machine to cause the machine to perform the method of claim 1.

11. The computer program product of claim 10, wherein:

the one or more attributes further comprises attributes that govern a degree of overlay or interleaving of an audio portion of the secondary video stream relative to an audio portion of the primary video stream;

a service level of each of the one or more attribute settings is determined dependent on the predetermined service level, and wherein each service level is associated with a predetermined set of settings;

at least one of the one or more attribute settings are modifiable by a user associated with the user identifier within one or more predetermined limits, wherein the one or more predetermined limits are determined by a subscription group or tariff band;

the one or more attributes further comprises at least a set of attributes that govern each of: a size of display of the secondary video stream, a position of the display of the secondary video stream, an opacity of the display of the secondary video stream, a color saturation of the secondary video stream, and a difference in contrast between the tones in secondary video stream and the primary video stream;

the predetermined service level further identifies one or more services to which one or more users associated with the predetermined service level are subscribed thereto;

the method performed by the machine further comprising:

measuring one or more modifications to the at least one of the one or more attribute settings; and in response to determining the one or more modifications to the at least one of the one or more attribute settings have been modified beyond one or more quality thresholds, changing a subscription group of the user identifier;

wherein the one or more modifications may be performed during reception of the primary video stream.

12. The computer program product of claim 10, wherein:

the secondary video stream comprises picture-in-picture (PiP) advertising data;

the primary video stream comprises a continuous live video transmission and one or both of the video streams is broadcast; and the functions are implemented within a video processing module that is a component of a television signal receiving apparatus.

13. The method according to claim 1, further comprising: in response to the secondary video stream ending, resuming processing of the primary video stream alone, wherein the primary video stream is received as a first transmission at a first tuner of a plurality of tuners and the secondary video stream is received as a second transmission at a second tuner of the plurality of tuners, and wherein the secondary video stream is different from the primary video stream.

14. The apparatus according to claim 6, the apparatus being further operable to:

in response to the secondary video stream ending, resume processing of the primary video stream alone, wherein the primary video stream is received as a first transmission at a first tuner of a plurality of tuners and the secondary video stream is received as a second transmission at a second tuner of the plurality of tuners, and wherein the secondary video stream is different from the primary video stream.

15. The computer program product of claim 11, the method performed by the machine further comprising: in response to the secondary video stream ending, resuming processing of the primary video stream alone, wherein the primary video stream is received as a first transmission at a first tuner of a plurality of tuners and the secondary video stream is received as a second transmission at a second tuner of the plurality of tuners, and wherein the secondary video stream is different from the primary video stream.

16. The method according to claim 13, wherein the secondary video stream is received as an additional transmission at a time when the plurality of tuners is not in use, the method further comprising:

storing the secondary video stream in a local storage.

17. The apparatus according to claim 14, wherein the secondary video stream is received as an additional transmission at a time when the plurality of tuners is not in use, the apparatus being further operable to:

store the secondary video stream in a local storage.

18. The computer program product of claim 15, wherein the secondary video stream is received as an additional transmission at a time when the plurality of tuners is not in use the method performed by the machine further comprising:

storing the secondary video stream in a local storage.

* * * * *